US010735625B2

(12) United States Patent
Nakazawa et al.

(10) Patent No.: US 10,735,625 B2
(45) Date of Patent: Aug. 4, 2020

(54) INFORMATION DETECTING DEVICE TO PERFORM A COLOR CONVERSION OPERATION ON IMAGE READ BY A READING SENSOR

(71) Applicants: Masamoto Nakazawa, Kanagawa (JP); Hideki Hashimoto, Tokyo (JP); Daisuke Nikaku, Kanagawa (JP)

(72) Inventors: Masamoto Nakazawa, Kanagawa (JP); Hideki Hashimoto, Tokyo (JP); Daisuke Nikaku, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/381,520

(22) Filed: Apr. 11, 2019

(65) Prior Publication Data

US 2019/0335061 A1 Oct. 31, 2019

(30) Foreign Application Priority Data

Apr. 27, 2018 (JP) ................... 2018-087369

(51) Int. Cl.
*H04N 1/40* (2006.01)
*H04N 1/193* (2006.01)
*H04N 1/54* (2006.01)

(52) U.S. Cl.
CPC ....... *H04N 1/40056* (2013.01); *H04N 1/1937* (2013.01); *H04N 1/40006* (2013.01); *H04N 1/54* (2013.01)

(58) Field of Classification Search
CPC ......... H04N 1/6016–6025; H04N 1/54; H04N 1/40056; H04N 1/028–0318
See application file for complete search history.

(56) References Cited

U.S. PATENT DOCUMENTS

2004/0105581 A1* 6/2004 Sawada ............... H04N 1/6019
382/162
2005/0206927 A1* 9/2005 Yamada ............... H04N 1/4072
358/1.9
(Continued)

FOREIGN PATENT DOCUMENTS

JP 2010-278999 12/2010
JP 2012-100225 5/2012

OTHER PUBLICATIONS

U.S. Appl. No. 16/269,592, filed Feb. 7, 2019, Masamoto Nakazawa, et al.
(Continued)

*Primary Examiner* — Nicholas Pachol
(74) *Attorney, Agent, or Firm* — Oblon, McClelland, Maier & Neustadt, L.L.P.

(57) ABSTRACT

An information detecting device detects information from a target. The information detecting device includes processing circuitry. The processing circuitry is configured to perform a first information acquisition operation of acquiring first information from a target criterion, a second information acquisition operation of acquiring second information from the target, and an information conversion operation of converting the second information acquired by the second information acquisition operation, into third information, with the first information acquired by the first information acquisition operation, the third information having a dimension different from respective dimensions of the first information and the second information; and perform control such that an information-acquisition condition in the first information acquisition operation is identical to an information-acquisition condition in the second information acquisition operation.

14 Claims, 13 Drawing Sheets

(56) References Cited

U.S. PATENT DOCUMENTS

| | | | |
|---|---|---|---|
| 2007/0165254 A1* | 7/2007 | Kuriyama | G01J 3/50 358/1.9 |
| 2007/0188638 A1 | 8/2007 | Nakazawa et al. | |
| 2008/0252787 A1 | 10/2008 | Nakazawa et al. | |
| 2010/0027061 A1 | 2/2010 | Nakazawa | |
| 2010/0171998 A1 | 7/2010 | Nakazawa | |
| 2011/0013242 A1* | 1/2011 | Hagio | H04N 1/00002 358/520 |
| 2011/0026083 A1 | 2/2011 | Nakazawa | |
| 2011/0026085 A1 | 2/2011 | Tsukahara et al. | |
| 2011/0051201 A1 | 3/2011 | Hashimoto et al. | |
| 2011/0063488 A1 | 3/2011 | Nakazawa | |
| 2012/0224205 A1 | 9/2012 | Nakazawa | |
| 2013/0044338 A1 | 2/2013 | Nikaku | |
| 2013/0063792 A1 | 3/2013 | Nakazawa | |
| 2014/0029065 A1 | 1/2014 | Nakazawa | |
| 2014/0078532 A1 | 3/2014 | Nikaku | |
| 2014/0204427 A1 | 7/2014 | Nakazawa | |
| 2014/0204432 A1 | 7/2014 | Hashimoto et al. | |
| 2014/0211273 A1 | 7/2014 | Konno et al. | |
| 2014/0368893 A1 | 12/2014 | Nakazawa et al. | |
| 2015/0098117 A1 | 4/2015 | Marumoto et al. | |
| 2015/0116794 A1 | 4/2015 | Nakazawa | |
| 2015/0163378 A1 | 6/2015 | Konno et al. | |
| 2015/0222790 A1 | 8/2015 | Asaba et al. | |
| 2015/0304517 A1 | 10/2015 | Nakazawa et al. | |
| 2015/0346028 A1* | 12/2015 | Furuta | G01J 3/502 356/408 |
| 2016/0003673 A1 | 1/2016 | Hashimoto et al. | |
| 2016/0006961 A1 | 1/2016 | Asaba et al. | |
| 2016/0088179 A1 | 3/2016 | Nakazawa et al. | |
| 2016/0112660 A1 | 4/2016 | Nakazawa et al. | |
| 2016/0119495 A1 | 4/2016 | Konno et al. | |
| 2016/0173719 A1 | 6/2016 | Hashimoto et al. | |
| 2016/0219163 A1 | 7/2016 | Shirado et al. | |
| 2016/0268330 A1 | 9/2016 | Nakazawa et al. | |
| 2016/0295138 A1 | 10/2016 | Asaba et al. | |
| 2016/0373604 A1 | 12/2016 | Hashimoto et al. | |
| 2017/0019567 A1 | 1/2017 | Konno et al. | |
| 2017/0163836 A1 | 6/2017 | Nakazawa | |
| 2017/0170225 A1 | 6/2017 | Asaba et al. | |
| 2017/0201700 A1 | 7/2017 | Hashimoto et al. | |
| 2017/0244853 A1 | 8/2017 | Yabuuchi et al. | |
| 2017/0295298 A1 | 10/2017 | Ozaki et al. | |
| 2017/0302821 A1 | 10/2017 | Sasa et al. | |
| 2017/0324883 A1 | 11/2017 | Konno et al. | |
| 2018/0139345 A1 | 5/2018 | Goh et al. | |
| 2018/0146150 A1 | 5/2018 | Shirado et al. | |
| 2018/0175096 A1 | 6/2018 | Inoue et al. | |
| 2018/0213124 A1 | 7/2018 | Yokohama et al. | |
| 2018/0261642 A1 | 9/2018 | Asaba et al. | |
| 2018/0367702 A1* | 12/2018 | Kubo | G03G 9/0902 |
| 2018/0367705 A1* | 12/2018 | Yamauchi | H04N 1/54 |
| 2019/0068838 A1* | 2/2019 | Tashiro | G06K 9/4652 |
| 2019/0075221 A1* | 3/2019 | Kubo | H04N 1/00023 |
| 2019/0124233 A1* | 4/2019 | Fukasawa | H04N 1/54 |

OTHER PUBLICATIONS

U.S. Appl. No. 16/135,578, filed Sep. 19, 2018, Daisuke Nikaku, et al.

U.S. Appl. No. 16/255,872, filed Jan. 24, 2019, Ryohma Ikemoto, et al.

* cited by examiner

INFORMATION DETECTING DEVICE TO PERFORM A COLOR CONVERSION OPERATION ON IMAGE READ BY A READING SENSOR

CROSS-REFERENCE TO RELATED APPLICATION

This patent application is based on and claims priority pursuant to 35 U.S.C. § 119(a) to Japanese Patent Application No. 2018-087369, filed on Apr. 27, 2018, in the Japan Patent Office, the entire disclosure of which is hereby incorporated by reference herein.

BACKGROUND

Technical Field

Aspects of the present disclosure relate to an information detecting device, a reading device, an image forming apparatus, an information detecting method, and a recording medium.

Related Art

In a production print (PP) field, there is an in-machine sensing technique of reading a printed image with a sensing mechanism (in-line sensor) provided in a machine, such as a printing machine, and feeding a result of the reading back to a printing mechanism. In general, the in-line sensor includes a mechanism identical to the mechanism of an image reading device. An image read by the in-line sensor is converted from information regarding a color space of RGB into information regarding a different dimensional color space of CMYK, Lab, or Luv. Then, the color information is fed back to an adjustment function.

A light emitting diode (LED) is mainly adopted as a light source for the in-line sensor. It has been known in general that manufacturing variation causes variation in chromaticity between LEDs. As a technique of absorbing influence based on the variation during color-space conversion, proposed is a technique of reading a color sample identical in color to the luminescent color of a light source, estimating the chromaticity of the light source from a result of the reading, and selecting a color conversion formula.

However, there are variations in luminescent intensity (luminous intensity) between LEDs. Typically, for adjustment of luminescent intensity, light quantity is adjusted with increase or decrease of the driving current of an LED. The change of the driving current in this manner causes a variation different from an estimate in the chromaticity of the LED. Color conversion performed with a color conversion formula generated on the basis of reading of a target criterion, such as a color sample, causes deterioration in the accuracy of color conversion. In recent years, because printing quality requires highly color reproducibility and highly color stability, in particular, deterioration in the accuracy of color conversion results in a disadvantage in printing quality. The disadvantage is a widely common problem between information detection fields for information other than chromaticity. Due to generalization, a difference between respective information-acquisition conditions, such as driving current, in first information and second information, causes deterioration in the accuracy of conversion into third information.

SUMMARY

In an aspect of the present disclosure, there is provided an information detecting device that detects information from a target. The information detecting device includes processing circuitry. The processing circuitry is configured to perform a first information acquisition operation of acquiring first information from a target criterion, a second information acquisition operation of acquiring second information from the target, and an information conversion operation of converting the second information acquired by the second information acquisition operation, into third information, with the first information acquired by the first information acquisition operation, the third information having a dimension different from respective dimensions of the first information and the second information; and perform control such that an information-acquisition condition in the first information acquisition operation is identical to an information-acquisition condition in the second information acquisition operation.

In another aspect of the present disclosure, there is provided a reading device that includes a light source, a reading sensor, and processing circuitry. The light source is configured to irradiate a subject with light. The reading sensor is configured to receive the light from the subject. The processing circuitry is configured to control a first reading operation of reading a criterion subject, a second reading operation of reading the subject, a color-conversion-formula generation operation of generating a color conversion formula with first color information acquired by the first reading operation, and a color conversion operation of converting second color information acquired by the second reading operation, into third color information, with the color conversion formula, the third color information having a color space different from respective color spaces of the first color information and the second color information; and perform control such that an irradiation condition of the light source in the first reading operation is identical to an irradiation condition of the light source in the second reading operation.

In still another aspect of the present disclosure, there is provided an information detecting method of detecting information from a target. The information detecting method includes performing a first information acquisition operation of acquiring first information from a target criterion; performing a second information acquisition operation of acquiring second information from the target; performing an information conversion operation of converting the second information acquired by the second information acquisition operation, into third information, with the first information acquired by the first information acquisition operation, the third information having a dimension different from respective dimensions of the first information and the second information; and performing control such that an information-acquisition condition in the first information acquisition operation is identical to an information-acquisition condition in the second information acquisition operation.

In still yet another aspect of the present disclosure, there is provided a non-transitory recording medium storing a plurality of instructions which, when executed by one or more processors, cause the processors to: perform a first information acquisition operation of acquiring first information from a target criterion; perform a second information acquisition operation of acquiring second information from the target; perform an information conversion operation of converting the second information acquired by the second information acquisition operation, into third information, with the first information acquired by the first information acquisition operation, the third information having a dimension different from respective dimensions of the first information and the second information; and perform control such that an information-acquisition condition in the first information acquisition operation is identical to an information-acquisition condition in the second information acquisition operation.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
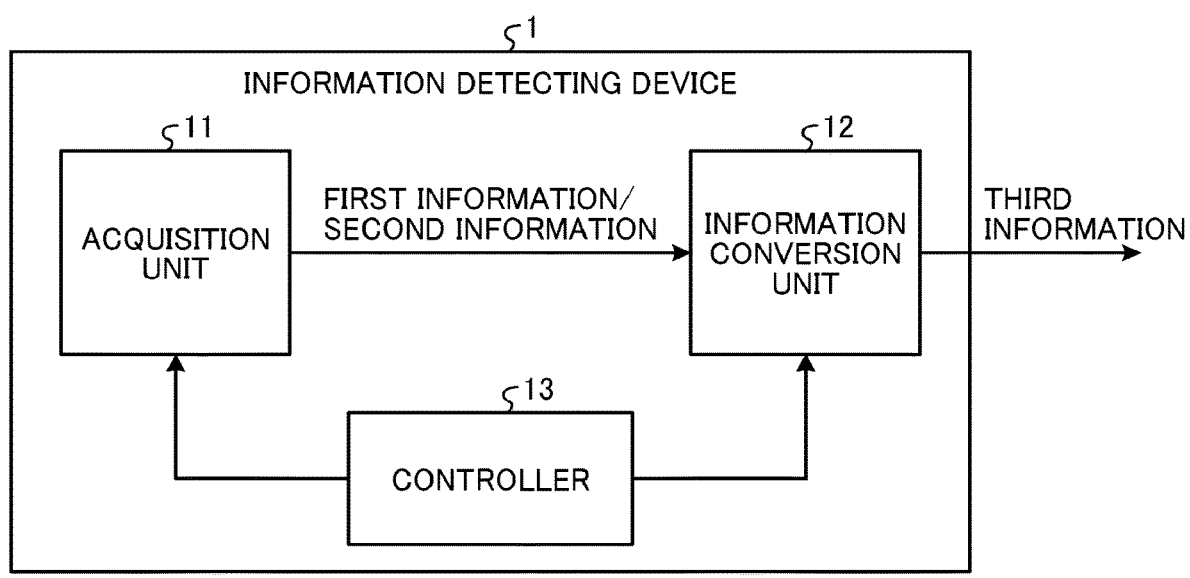
FIG. 1 is a diagram of an exemplary basic configuration of an information detecting device according to the present embodiment.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments

Embodiments of an information detecting device, a reading device, an image forming apparatus, an information detecting method, and a program will be described in detail below with reference to the accompanying drawings. Note that the embodiments are just exemplary, and thus each embodiment may be appropriately combined with another or may be modified.

FIG. 1 is a diagram of an exemplary basic configuration of an information detecting device according to the present embodiment. FIG. 1 illustrates the configuration of an exemplary information detecting device 1 including an acquisition unit 11, an information conversion unit 12, and a controller 13. Note that as long as the information detecting device 1 includes at least the controller 13 capable of controlling the acquisition unit 11 and the information conversion unit 12, the acquisition unit 11 and the information conversion unit 12 may be provided outside.

The acquisition unit 11 acquires respective pieces of information from a target criterion and a target that are each an information-acquisition target. The information acquired from the target criterion (first information) is used as criterion information for the information acquired from the target (second information).

The information conversion unit 12 converts the second information acquired from the target, into third information, on the basis of the first information acquired from the target criterion. For example, the information conversion unit 12 converts the second information into the third information, with an information conversion formula based on the first information. Here, the information conversion formula is a conversion formula for conversion into the third information indicated with a dimension different from the dimension of the second information (or the first information). The different dimension corresponds to a coordinate system indicated with a parameter group different from the parameter group of the second information (or the first information). The different in dimension indicates, for example, a difference in color space between an "RGB" color system and an "L*a*b*" color system.

The controller 13 controls the control targets to perform a first information acquisition operation, a second information acquisition operation, and an information conversion operation. During the first information acquisition operation, the acquisition unit 11 acquires the first information from the target criterion. During the second information acquisition operation, the acquisition unit 11 acquires the second information from the target. During the information conversion operation, the information conversion unit 12 converts the second information into the third information, on the basis of the first information (e.g., the information conversion formula based on the first information).

Furthermore, the controller 13 controls the control target such that the information-acquisition condition in the first information acquisition operation is identical to the information-acquisition condition in the second information acquisition operation. Specifically, the controller 13 performs control such that the respective information-acquisition conditions are identical when the acquisition unit 11 acquires the information from the target criterion and the information from the target. The controller 13 controls the information conversion unit 12 on the basis of the information-acquisition conditions.

Figures 2A, 2B:
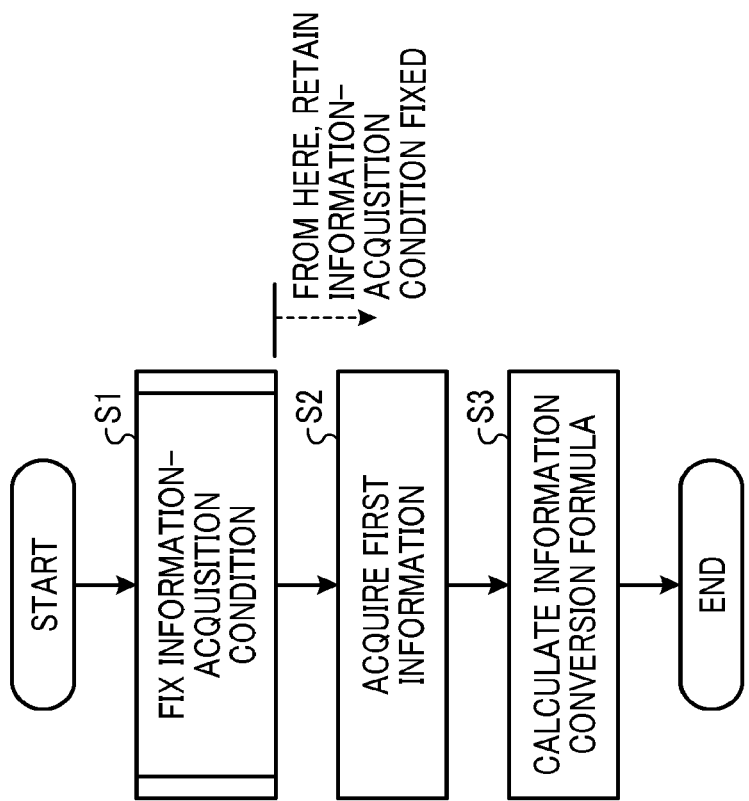
FIGS. 2A and 2B are each a flowchart of an exemplary control flow of a controller.

FIGS. 2A and 2B are each a flowchart of an exemplary control flow of the controller 13. FIG. 2A illustrates a control flow at an information-detection preliminary stage including the first information acquisition operation and the information conversion operation. FIG. 2B illustrates a control flow at an information-detection execution stage including the second information acquisition operation and the information conversion operation.

First, the controller 13 generates an information conversion formula with the control illustrated in FIG. 2A at the information-detection preliminary stage. Specifically, as the first information acquisition operation, the controller 13 fixes the information-acquisition condition of the acquisition unit 11 (S1), and causes the acquisition unit 11 with the fixed information-acquisition condition, to acquire the first information (S2).

Subsequently, as the information conversion operation, the controller 13 causes the information conversion unit 12 to calculate the information conversion formula, on the basis of the first information (S3). The information conversion unit 12 retains the information conversion formula generated by the calculation.

In this manner, the controller 13 performs the first information acquisition operation and the information conversion operation at the information-detection preliminary stage, to generate the information conversion formula with the first information acquired from the target criterion.

Subsequently, the controller 13 performs information detection with the control illustrated in FIG. 2B at the information-detection execution stage. Specifically, as the second information acquisition operation, the controller 13 causes the acquisition unit 11 with a condition identical to the information-acquisition condition at step S1, to acquire the second information (S5).

Subsequently, as the information conversion operation, the controller 13 specifies the information conversion formula generated at step S3 and causes the information conversion unit 12 to convert the second information into the third information (S6).

With this configuration, the information detecting device according to the present embodiment acquires the second information with an information acquisition condition identical to the information-acquisition condition at the acquisition of the first information, and converts the second information into the third information, on the basis of the first information. That is the information detecting device according to the present embodiment fixes the respective information-acquisition conditions at the same value in the first information acquisition operation and the second information acquisition operation, resulting in enhancement of the correlation between the first information and the second information. Thus, the information detecting device according to the present embodiment inhibits the accuracy of conversion into the third information from deteriorating due to the difference between the respective information-acquisition conditions of the first information and the second information, resulting in retention or improvement of the accuracy of conversion into the third information.

Note that the information-acquisition conditions are preferably in agreement in terms of all factors related to the acquisition of the information (e.g., ambient temperature, and the driving current and the driving voltage of the acquisition unit 11). However, even in a case where the information acquisition conditions are in agreement in terms of part of the factors, such as the driving current or the driving voltage of the acquisition unit 11, the accuracy of conversion into the third information is inhibited from deteriorating, resulting in retention or improvement of the accuracy of conversion into the third information.

First Embodiment

Next, application of the information detecting device 1 illustrated in FIG. 1 to a reading device, will be described.

For example, the information detecting device 1 is considered to be applied to a reading device (in-line sensor) used for calibration of a printing machine. As a first embodiment, exemplary application to a reading device (in-line sensor) used for calibration of a printing machine, will be described below.

Figure 3:
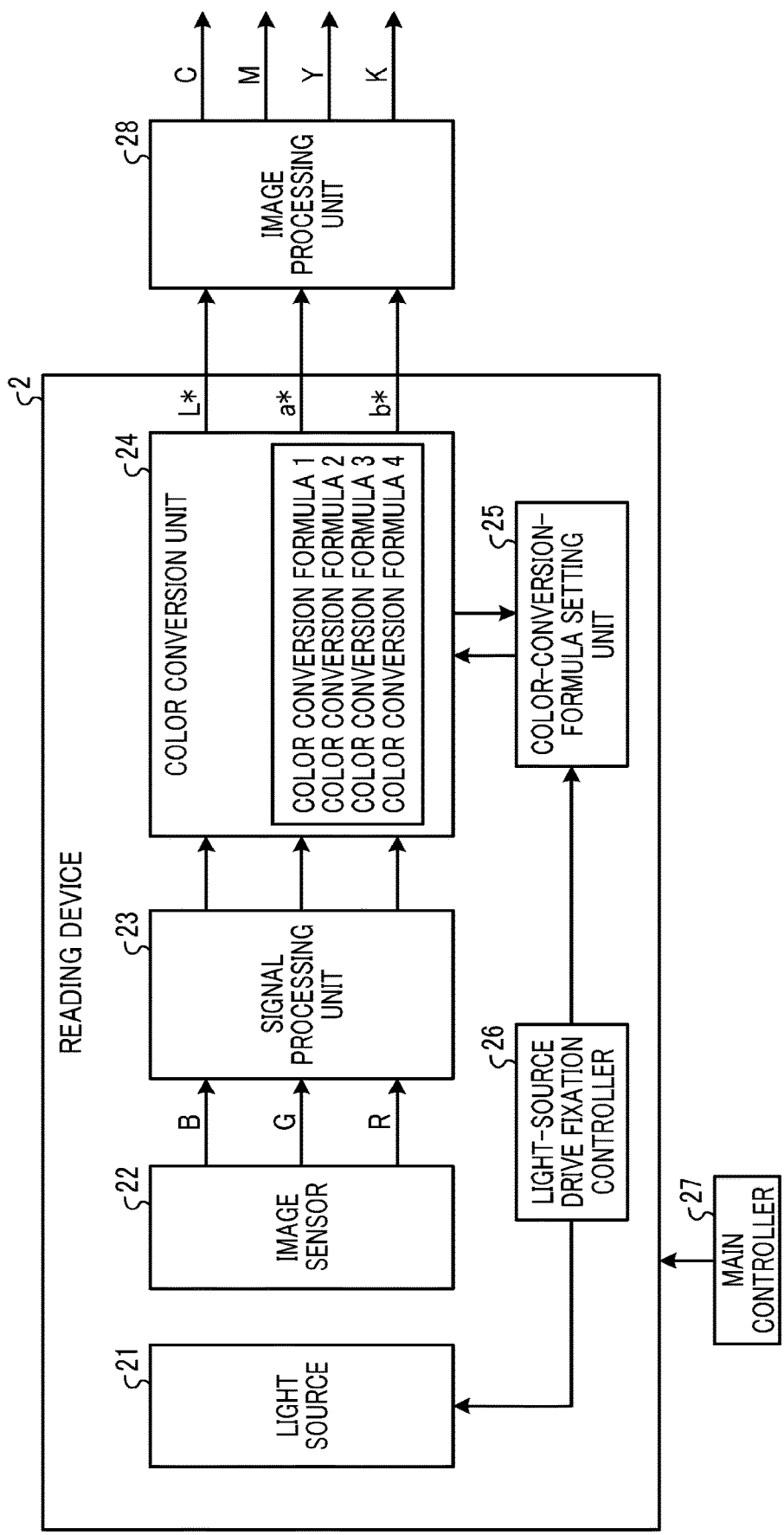
FIG. 3 is a diagram of an exemplary configuration of a reading device according to a first embodiment.

FIG. 3 is a diagram of an exemplary configuration of the reading device according to the first embodiment. FIG. 3 illustrates the main configuration of the reading device. A reading device 2 illustrated in FIG. 3 mainly includes a light source 21, an image sensor 22, a signal processing unit 23, a color conversion unit 24, a color-conversion-formula setting unit 25, a light-source drive fixation controller 26, and a main controller 27. Note that FIG. 3 illustrates, as an exemplary configuration in which the reading device 2 is attached to a printing machine, an image processing unit 28 provided at the printing machine. The image processing unit 28 may be provided at the printing machine as illustrated in FIG. 3, or may be provided at the reading device 2.

The light source 21 illuminates a reading target with light. Here, exemplary use of a pseudo-white LED as the light source 21, is given. The pseudo-white LED including a blue LED chip and a yellow phosphor (complementary color for blue), generates pseudo-white light with mixture of blue light emitted from the blue LED chip and yellow light emitted from the phosphor excited by the blue light. For example, the phosphor includes transmissive resin containing yellow fluorescent material. Note that the configuration of the pseudo-white LED described here is exemplary, and thus the pseudo-white LED may have a different configuration. For example, an appropriate combination of an LED and a phosphor in different colors may be used. Unless otherwise specified, a "white LED" corresponds to a "pseudo-white LED", below.

A "reading target (subject)" corresponds to a "target criterion" or a "target". A "criterion chart (criterion subject)" and a "printed image (printing image)" in the "reading target" correspond to the "target criterion" and the "target", respectively.

The image sensor 22 that is an exemplary "reading sensor", includes a charge coupled device (CCD) or a complementary metal oxide semiconductor (CMOS). The image sensor 22 having a light receiving face, receives reflected light from the reading target irradiated with the light by the light source 21, on the light receiving face through an optical system (e.g., an optical lens and an optical mirror). The image sensor 22 photoelectrically converts an optical image of the reading target received on the light-receiving face, in units of pixels, and performs, for example, black-level correction to an image signal of the reading target. Then, the image sensor 22 outputs the image signal to the subsequent stage. Note that FIG. 3 illustrates that the image sensor outputs an image signal of an RGB image of red (R) color, green (G) color, and blue (B) color, exemplarily.

The signal processing unit 23 performs various types of signal processing, such as A/D conversion and shading correction, to the image signal output from the image sensor 22 (an R image signal, a G image signal, and a B image signal).

The color conversion unit 24 converts image data output from the signal processing unit 23, into an arbitrary color space value. FIG. 3 illustrates that the color space value is converted from an "RGB" color system into an "L*a*b*" color system, exemplarily. Here, a color space indicated in the "RGB" color system corresponds to a "first color space", and a color space indicated in the "L*a*b*" color system converted by the color conversion unit 24 corresponds to a "second color space". The color conversion unit 24 retaining color conversion formulae generated before factory shipment, for example, in a memory, converts the color space value from the first color space into the second color space with a color conversion formula from the color conversion formulae, to convert first information (or second information) into third information.

For each driving current value for the light source 21, fixed by the light-source drive fixation controller 26 at a setting stage (corresponding to the information-detection preliminary stage) before the factory shipment, the color-conversion-formula setting unit 25 sets the corresponding color conversion formulae to the driving current value, to the color conversion unit 24. At an utilization stage (corresponding to the information-detection execution stage) by a user after the factory shipment, the color-conversion-formula setting unit 25 estimates chromaticity with an output value (e.g., a "b*" value) of the color conversion unit 24 acquired by reading of the "criterion chart". The color-conversion-formula setting unit 25 selects and determines, as a color conversion formula to be used in the reading device, an optimum color conversion formula close to the estimated chromaticity, from the color conversion formulae set in the color conversion unit 24.

The light-source drive fixation controller 26 fixes a driving current value for the irradiation condition of the light source 21, and outputs the fixed driving current value to the color-conversion-formula setting unit 25 for synchronization of the driving current value with color conversion.

The main controller 27 controls the operation of the entire reading device 2. The main controller 27 issues a printing instruction to an image forming unit at the subsequent stage.

The image processing unit 28 converts the signal converted into the second color space (third information), into the printing format of the printing machine (e.g., CMYK).

Here, the light source 21 and the image sensor 22 mainly correspond to the acquisition unit 11 (refer to FIG. 1). The color conversion unit 24 and the color-conversion-formula setting unit 25 mainly correspond to the information conversion unit 12 (refer to FIG. 1). The light-source drive fixation controller 26 and the main controller 27 mainly correspond to the controller 13 (refer to FIG. 1).

Next, a "first information acquisition operation", a "second information acquisition operation", and an "information conversion operation" in the reading device 2 will be described.

Figure 4B:
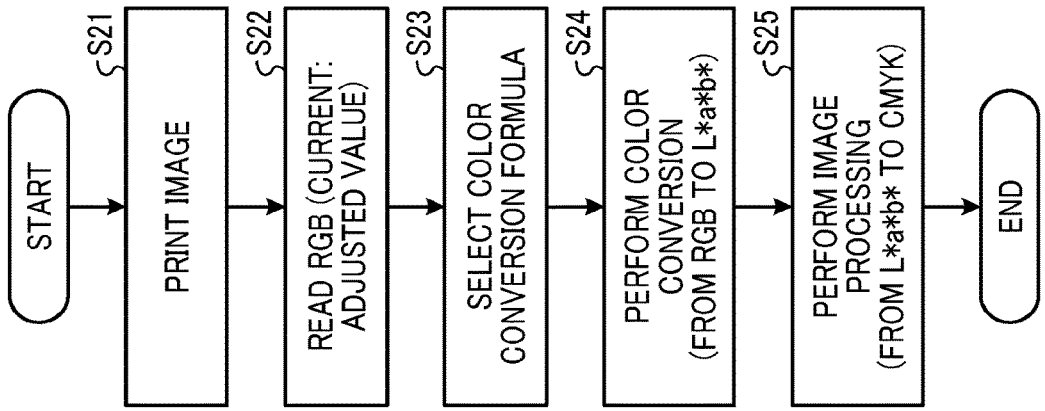
FIGS. 4A and 4B are each a flowchart of an exemplary control flow of a main controller.
Figure 4A:
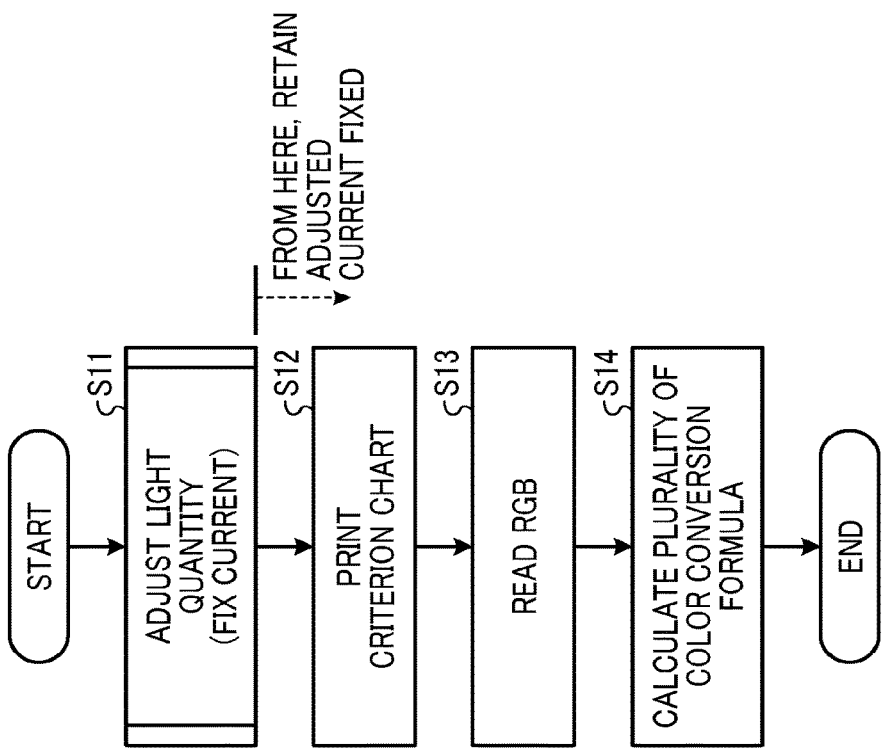

FIGS. 4A and 4B are each a flowchart of an exemplary control flow of the main controller 27. FIG. 4A illustrates a control flow in which the first information acquisition operation and the information conversion operation are performed at a color-detection preliminary stage. FIG. 4B illustrates a control flow in which the second information acquisition operation (or the first information acquisition operation) and the information conversion operation are performed at a color-detection execution stage.

First, the main controller 27 generates color conversion formulae with the control illustrated in FIG. 4A, at the color-detection preliminary stage, for example, before the factory shipment. The main controller 27 sets the generated color conversion formulae to the color conversion unit 24.

Specifically, the main controller 27 first performs light-quantity adjustment, and fixes a current value (S11). For the light-quantity adjustment, the driving current of the light source 21 is adjusted such that the irradiation state of the light source 21 meets a desired state. After the light-quantity adjustment, the light-source drive fixation controller 26 fixes the driving current at the adjusted value.

Subsequently, the main controller 27 causes the image forming unit at the subsequent stage to print a criterion chart (S12), and causes the image sensor 22 to read an image of the printed criterion chart (S13).

Subsequently, the main controller 27 calculates color conversion formulae, on the basis of image data of the criterion chart read by the image sensor 22 (S14). The color-conversion-formula setting unit 25 sets the calculated color conversion formulae to the memory of the color conversion unit 24, and the memory retains the calculated color conversion formulae.

Here, the calculated color conversion formulae each including, for example, a higher-order conversion matrix including an arbitrary parameter group, are optimum to the adjusted driving current value. Note that the color conversion formulae may be generated by a colorimeter from a printing image printed from the image data of the criterion chart.

Subsequently, the main controller 27 performs color detection with the control illustrated in FIG. 4B, in use by the user after the factory shipment (color-detection execution stage).

Specifically, in order to read a subject to which the color detection is to be performed, the main controller 27 first causes, for example, the image forming unit to print an image (S21) and causes the image sensor 22 to read the printing image (S22). The driving current of the light source 21 in the reading of the image is fixed at the driving current value (adjusted value) fixed at the color-detection preliminary stage, by the light-source drive fixation controller 26.

Subsequently, the main controller 27 selects an optimum color conversion formula from the plurality of color conversion formulae, on the basis of image data of the printing image read by the image sensor 22 (S23).

Subsequently, the main controller 27 causes conversion of the color space value of the image data from the "RGB" color system into the "L*a*b*" color system, with the selected color conversion formula (S24). For example, the image processing unit 28 converts the converted color space value into CMYK, in accordance with an application at the subsequent stage (S25). For example, the converted data is fed back to the image forming unit at the subsequent stage, and is used for correction of the forming condition of the image forming unit.

Note that, according to the present embodiment, the example in which the driving current is adjusted variably for the light-quantity adjustment, has been given. However, the light-quantity adjustment is not limited to this, and thus may be made by voltage adjustment. The criterion chart is printed by the image forming unit, but may be a medium of which coloration is known, such as a criterion colored board, the medium being irrelevant to the image forming unit. Furthermore, the conversion of the image processing unit 28 is not limited to CMYK, and thus may be appropriately changed in accordance with the application at the subsequent stage.

In this manner, at the color-detection preliminary stage, the reading device 2 reads the image of the printed criterion chart while fixing the driving current value of the light source 21, and generates the color conversion formulae on the basis of the image data (corresponding to the "first information"). At the color-detection execution stage, the reading device 2 reads the printing image with the driving current value fixed at the color-detection preliminary stage. With the color conversion formula selected for the image data (corresponding to the "second information"), the reading device 2 converts the image data indicated with the color space in the RGB color system (corresponding to the "first color space") into the image data (corresponding to the "third information") indicated with the color space in the L*a*b* color system (corresponding to the "second color space").

Next, effect due to fixation of the driving current value of the light source 21 by the light-source drive fixation controller 26, will be described.

Figure 5A:
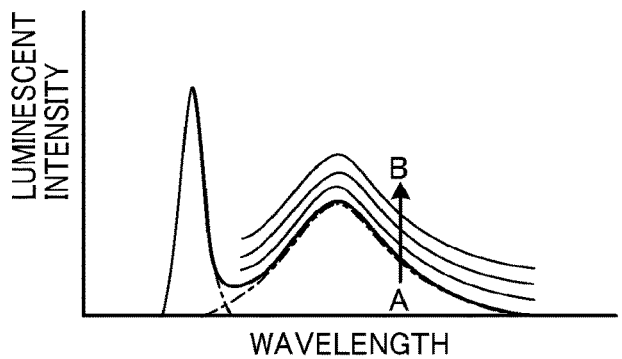
FIGS. 5A to 5F are explanatory graphs for effect due to fixation of the driving current value of a light source.
Figure 5B:
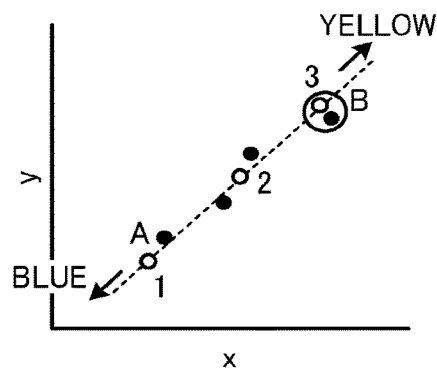
Figure 5C:
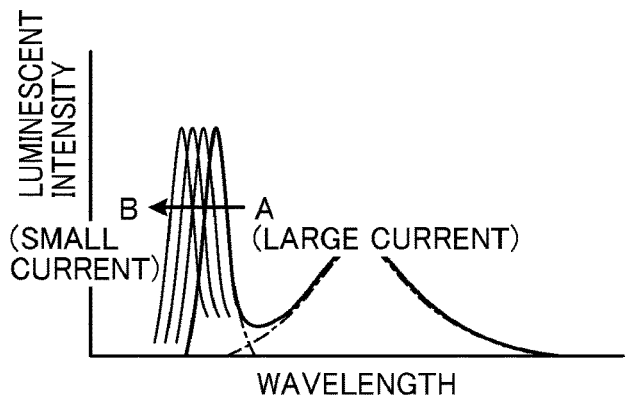
Figure 5D:
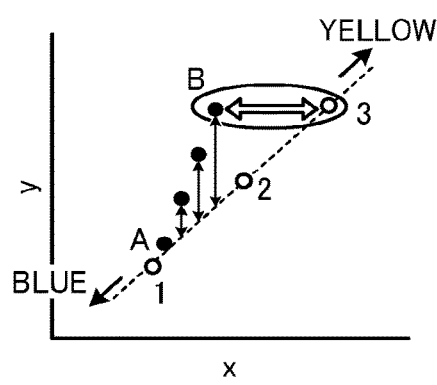
Figure 5E:
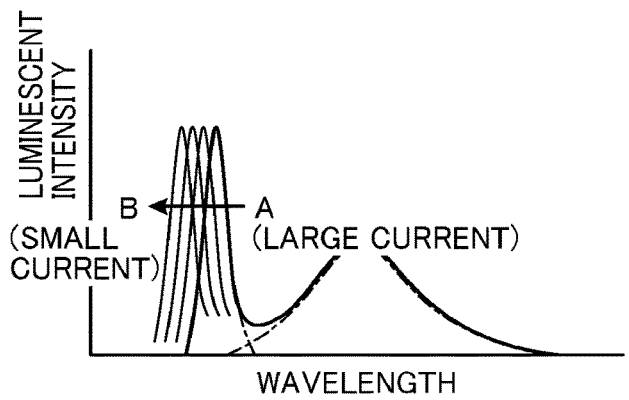
Figure 5F:
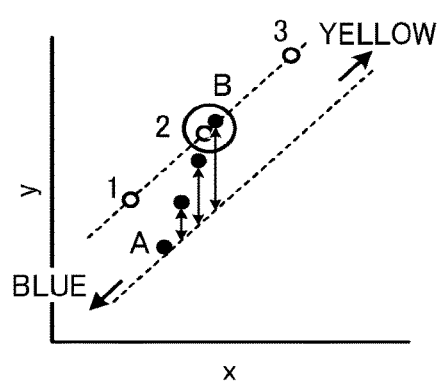

FIGS. 5A to 5F are explanatory graphs for the effect due to fixation of the driving current value of the light source 21. FIGS. 5A and 5B illustrate the relationship in variation between the color conversion formulae and the chromaticity of the light source being used, under a limitative condition in consideration of no adjustment of the driving current of the light source. FIGS. 5C and 5D illustrate, in a case where the driving current of the light source requires adjusting, the relationship in variation between the color conversion formulae and the chromaticity of the light source being used, with no adjustment of the driving current. FIGS. 5E and 5F illustrate, as in the reading device according to the present embodiment, in a case where the driving current of the light source requires adjusting, the relationship in variation between the color conversion formulae and the chromaticity of the light source being used, with the driving current fixed. FIGS. 5A, 5C, and 5E are each a graph of the relationship between the light wavelength and the luminescent intensity of the light source 21 in the case. FIGS. 5B, 5D, and 5F each illustrate the relationship in variation between the color conversion formulae and the chromaticity of the light source being used in the case, on an XY chromaticity diagram.

First, the relationship in variation between the color conversion formulae and the chromaticity of the light source being used, will be described with the case of FIGS. 5A and 5B. As illustrated in FIG. 5A, the luminescent intensity characteristic in the entire wavelength region changes in accordance with the mixing ratio of the blue light emitted from the blue LED and the yellow light of the phosphor. Mainly, the luminescent intensity characteristic of the light emitted from the blue LED is indicated in a blue region on the shorter-wavelength side. Mainly, the luminescent intensity characteristic of the light of the phosphor is indicated in a region longer in wavelength than the blue region. The two regions include a peak in blue luminescent intensity and a peak in yellow luminescent intensity, respectively. The white LED being used in the present embodiment has a manufacturing variation. An example of the manufacturing variation is ununiform coating in yellow of the phosphor. Thus, in accordance with the mixing ratio of blue and yellow in the white LED being used, the white LED has any of characteristic graphs A to B.

FIG. 5B illustrates open circles (1, 2, 3, . . . ) in chromaticity corresponding to the color conversion formulae (color conversion formula 1, color conversion formula 2, color conversion formula 3, . . . ) set in the color conversion unit 24, and illustrates the chromaticity (x, y) of the white LED being used, with filled circles. As illustrated in FIG. 5B, under the limitative condition in consideration of no adjustment of the driving current of the light source 21, the chromaticity changes monotonously in accordance with the mixing ratio of the luminescent colors. Thus, the chromaticity of the white LED being used (filled circle) follows on a line of the chromaticity (open circles) (or in the neighborhood of the line). Thus, use of the color conversion formula of the chromaticity (open circle) closest to the chromaticity of the white LED being used (filled circle), enables inhibition of an error from increasing in color conversion.

Next, a variation in chromaticity in a case where the driving current of the light source 21 requires adjusting, will be described. Because the driving current typically requires adjusting, this case requires considering. FIG. 5C illustrates a change in the luminescent intensity characteristic in a blue region of the light source 21 in a case where the driving current of the light source 21 is adjusted for light-quantity adjustment. FIG. 5C illustrates the adjustment from large current to small current, exemplarily. As illustrated in FIG. 5C, increase of the driving current (to large current) causes the light wavelength of the blue LED chip to shift to the longer wavelength side (A side of FIG. 5C). That is the luminescent wavelength in blue shifts. At this time, as in FIG. 5D, the change of the luminescent wavelength in blue causes the chromaticity of blue light (x, y) to change with parameter z different from parameters x and y. That is the chromaticity changes irrelevantly to a monotonous change due to the mixing ratio of the luminescent colors. Thus, the chromaticity of the white LED being used (filled circle) does not follow a line of the chromaticity (open circles). Thus, in a case where, for example, the driving current of the white LED being used is adjusted to small current (B), the chromaticity of the white LED being used (filled circle) disagrees in correlation with the chromaticity on the monotonous line (open circle). Even when the corresponding chromaticity (open circle 3 of FIG. 5D) is detected from the previously prepared color conversion formulae on the monotonous line, the color conversion formula does not meet the chromaticity of the white LED being used (filled circle), resulting in a large error in color conversion. Thus, the accuracy of color conversion deteriorates.

That is, in this case, the accuracy of color conversion deteriorates due to the change of the driving current accompanied with the light-quantity adjustment. Thus, the optimization of the light quantity (S/N) is incompatible with the accuracy of color conversion.

As in the reading device according to the present embodiment, in a case where the driving current of the light source requires adjusting, fixation of the driving current enables the compatibility of the optimization of the quantity of light with the accuracy of color conversion.

Specifically, the color conversion formulae are generated while the driving current of the white LED is fixed. Then, color detection is performed with the fixed driving current. FIG. 5F illustrates a monotonous line of the color conversion formulae (chromaticity (open circles)) in a case where the color conversion formulae are generated while the driving current of the white LED is fixed at small current B, exemplarily. As illustrated in FIG. 5F, in a case where the driving current of the white LED being used is adjusted at the small current (B), there is the monotonous line corresponding to the chromaticity of the white LED. Thus, selection of a neighboring color conversion formula on the monotonous line (corresponding line) enables inhibition of an error in color conversion even in a case where the driving current is adjusted. Thus, the accuracy of color conversion can be inhibited from deteriorating. That is the optimization of the light quantity (S/N) is compatible with the accuracy of color conversion.

As described above, uniformity of the driving current of the light source between generation of color conversion formulae and reading of a typical subject, enables offsetting of influence of a change in chromaticity due to the driving current, resulting in retention or improvement of the accuracy of color conversion even in a case where light-quantity adjustment is performed. Therefore, the luminescent intensity of the light source can be optimized, and the accuracy of color conversion can be prevented from deteriorating.

First Modification

According to the first embodiment, the plurality of color conversion formulae is set to the color conversion unit 24 at the color-detection preliminary stage, and an optimum color conversion formula is selected from the plurality of color conversion formulae at the color-detection execution stage. According to a first modification, a color conversion formula is set to a color conversion unit 240 for an individual object (individual object, such as a white LED or a reading device), and color detection is performed with the color conversion formula. Note that a configuration different from the configuration according to the first embodiment, will be mainly described. The same elements between the first embodiment and the first modification are denoted with the same reference signs, and thus the descriptions of the same elements will be omitted.

Figure 6:
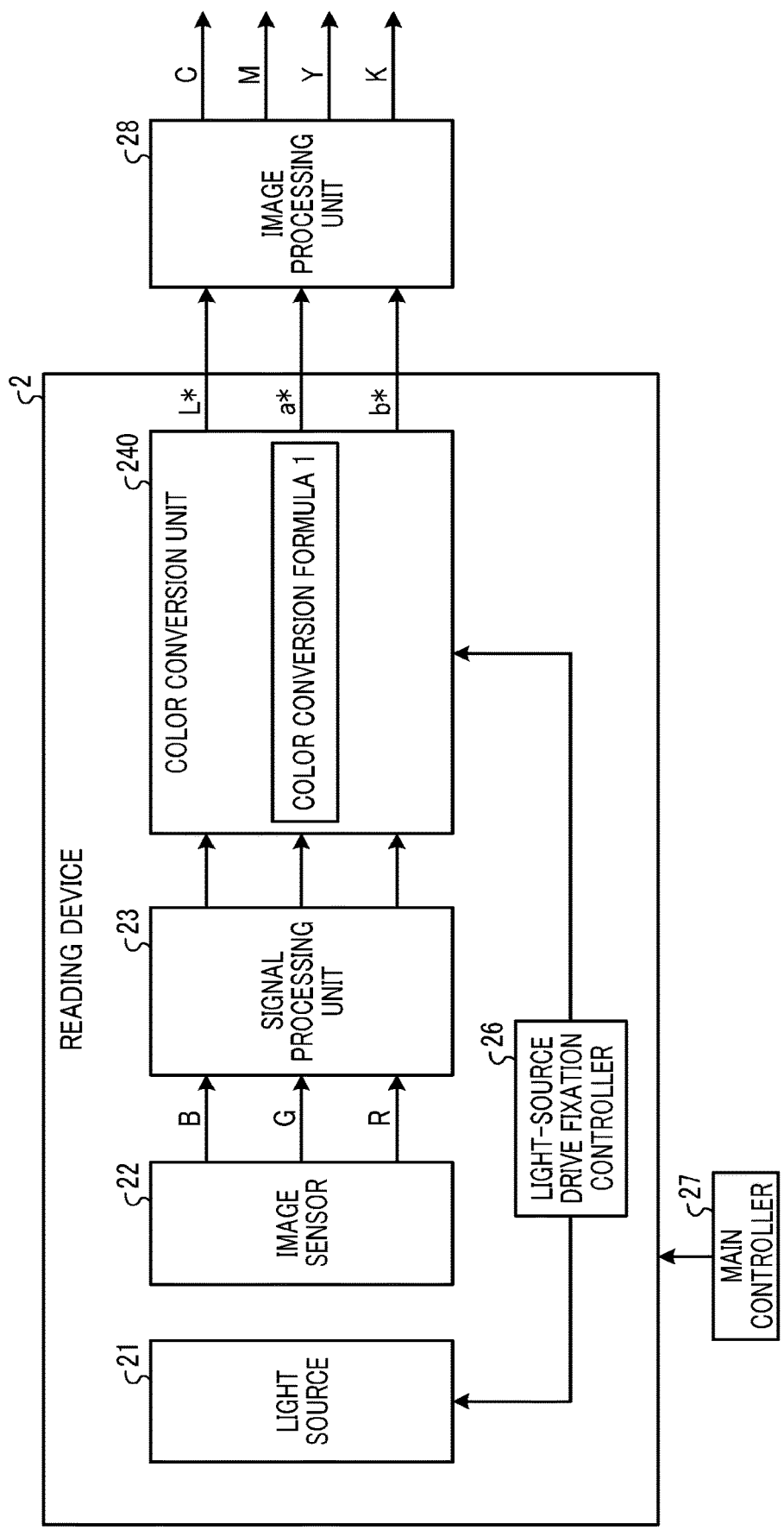
FIG. 6 is a diagram of an exemplary configuration of a reading device according to a first modification.

FIG. 6 is a diagram of an exemplary configuration of a reading device according to the first modification. A reading device 2 according to the first modification illustrated in FIG. 6 is different in configuration from the reading device 2 according to the first embodiment (refer to FIG. 3) in that the plurality of color conversion formulae is limited to one individual object. As illustrated in FIG. 6, the color conversion unit 240 set with one color conversion formula, is provided.

Figure 7B:
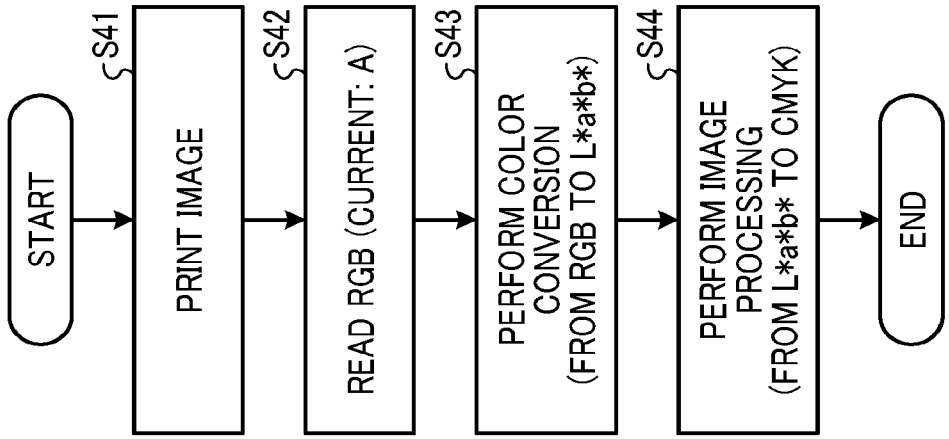
FIGS. 7A and 7B are each a flowchart of an exemplary control flow of a main controller.
Figure 7A:
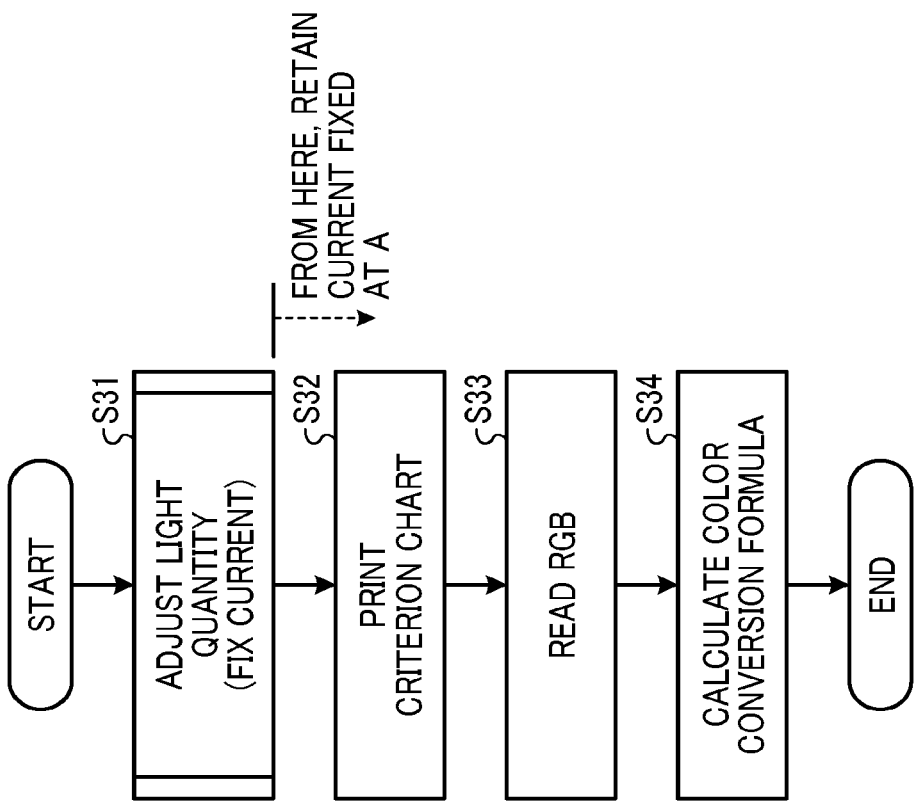

FIGS. 7A and 7B are each a flowchart of an exemplary control flow of a main controller 27. FIG. 7A illustrates a control flow in which a first information acquisition operation and an information conversion operation are performed at a color-detection preliminary stage. FIG. 7B illustrates a control flow in which a second information acquisition operation (or the first information acquisition operation) and an information conversion operation are performed at a color-detection execution stage.

Steps S31 to S34 in FIG. 7A correspond to steps S11 to S14 in the control flow indicated in the first embodiment (refer to FIG. 4A), respectively. A difference from the first embodiment is that an adjusted value for the individual object (current value A in this example) is used for fixation of a current value at step S31, instead of an adjusted arbitrary adjusted value. That is, basically, a color-conversion generation operation is required at least to be performed one time for an individual object. Note that, as long as a light source includes an LED as in the present configuration, in general, the lifetime of the light source is long and a change in light quantity due to elapse is small. Thus, even in a case where light-quantity adjustment is performed only one time as in the present example, influence on the accuracy of color conversion is small. Thus, a change in light quantity due to elapse is negligible.

Steps S41, S42, S43, and S44 in FIG. 7B correspond to steps S21, S22, S24, and S25 in the control flow indicated in the first embodiment (refer to FIG. 4B), respectively. A difference from the first embodiment is that the current value at step S42 is set at the adjusted value for the individual object (current value A in this example) and step S23 is omitted because no color conversion formula requires selecting (refer to FIG. 4B).

Figure 8A:
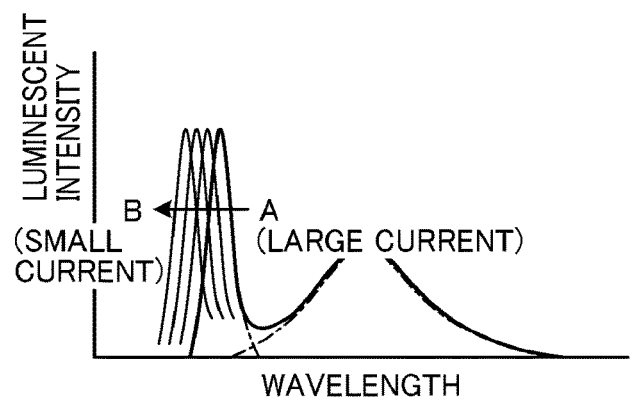
FIGS. 8A and 8B are each a graph of a variation in chromaticity with fixation of driving current in the configuration according to the first modification.
Figure 8B:
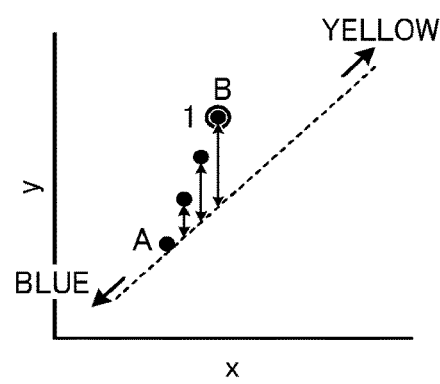

FIGS. 8A and 8B are graphs of effect in a case where driving current is fixed with the configuration according to the first modification. The present configuration causes generation of a color conversion formula for an individual object while the driving current of the white LED is fixed. Then, color conversion is performed with the fixed driving current for the individual object. FIG. 8A illustrates a shift in the luminescent intensity characteristic in a case where the driving current is changed, similarly to FIG. 5E.

FIG. 8B illustrates, for the white LED fixed at small current B, the relationship between the individual object and the chromaticity of the color conversion formula, exemplarily. FIG. 8B illustrates an open circle as the chromaticity corresponding to the color conversion formula generated with the driving current of the white LED fixed at the small current (B). According to the present configuration, one color conversion formula is provided for an individual object. Thus, FIG. 8B illustrates only one open circle, differently from FIG. 5F. According to the present configuration, color conversion is performed with the white LED for which the color conversion formula is generated. Thus, performance of the color conversion with the fixed value (small current B) at the generation of the color conversion formula, makes the chromaticity of the white LED and the chromaticity corresponding to the color conversion formula, in agreement. Thus, a filled circle overlaps with the open circle.

In this manner, the configuration according to the first modification causes, for an individual object of the light source, generation of a color conversion formula with a driving current value meeting the individual object. The color conversion formula can absorb an individual variation in the chromaticity or the luminous intensity of the light source. Thus, there is no need to retain the plurality of color conversion formulae in a memory, and the one color conversion formula meeting the individual object is required at least to be retained. Therefore, the present configuration enables cost reduction and miniaturization.

In a case where a color space is present between conversion formulae, a method of selecting one arbitrary color conversion formula from finite color conversion formulae, theoretically causes an error in color conversion. However, according to the present configuration, an optimized color conversion formula generated for an individual object, is used in color conversion, resulting in further reduction of an error in color conversion.

As described above, according to the present configuration, a color conversion formula is generated for an individual object, so that an individual difference can be absorbed. This arrangement theoretically enables inhibition of an error in color conversion, resulting in improvement in the accuracy of color conversion.

Next, a light-quantity adjustment operation will be described. There are large variations in luminous intensity between LEDs, and thus light-quantity adjustment is performed in general. First, a light-quantity adjustment operation of maximizing the light quantity of the light source, will described. Next, a light-quantity adjustment operation with an extended density handling range in color conversion, will be described.

Figure 9:
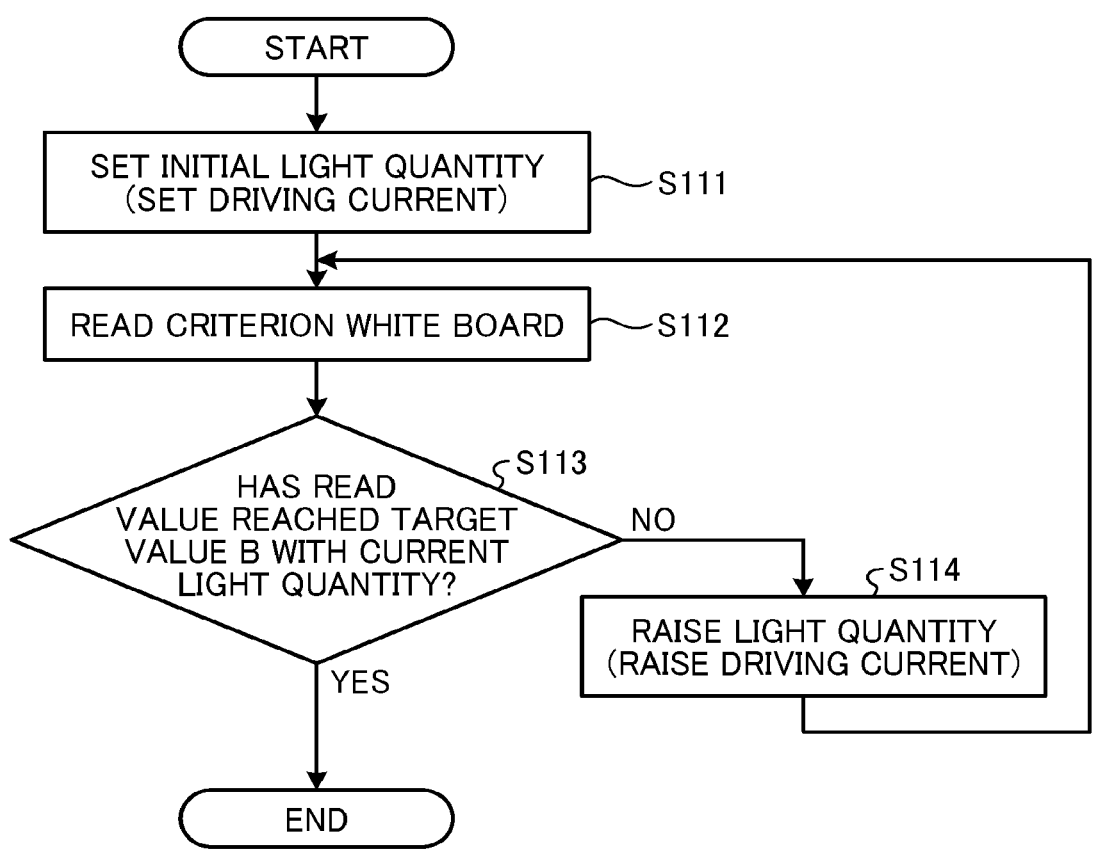
FIG. 9 is a flowchart of a control flow of a light-quantity adjustment operation of maximizing the light quantity of a light source.

FIG. 9 is a flowchart of a control flow of the light-quantity adjustment operation of maximizing the light quantity of the light source. First, the main controller 27 sets an initial light quantity (S111). The initial light quantity is set with the driving current at an arbitrary value. Here, in order to prevent an image sensor 22 from being saturated, the driving current is set such that a read value is less than a final-adjustment read value (target value B).

Subsequently, the main controller 27 reads a criterion medium, such as a criterion white board (S112), and determines whether the read value of the criterion medium has reached the target value B (S113). Specifically, the main controller 27 determines whether the read value has reached the target value B with the current light quantity.

In a case where determining that the read value has not reached the target value B (S113: No), the main controller 27 increases the driving current in order to further raise the light quantity (S114), reads the criterion white board again (S112), and determines whether the read value has reached the target value B (S113). In this manner, repetition of steps S112 to S114 causes the read value to converge to the target value B.

As a result, in a case where determining that the read value has reached the target value B with the current light quantity (S113: Yes), the main controller 27 finishes the present light-quantity adjustment operation.

In this manner, performance of the light-quantity adjustment for maximization of the light quantity of the light source, enables reduction of influence of photon shot noise, improvement of the S/N of an image, and improvement of the accuracy of color conversion.

In the light-quantity adjustment operation illustrated in FIG. 9, the light-quantity adjustment with the criterion white board is performed such that the read value of the criterion white board is not saturated. Thus, if a subject brighter in density than the criterion white board is read, theoretically, the read value of the subject is likely to be saturated, disabling color detection. That is a narrow density handling range in color conversion may be a disadvantage. In some cases, an application requires a density handling range rather than improvement of S/N with a rise in light quantity. Thus, the density handling range is one of important factors for color detection.

Figure 10:
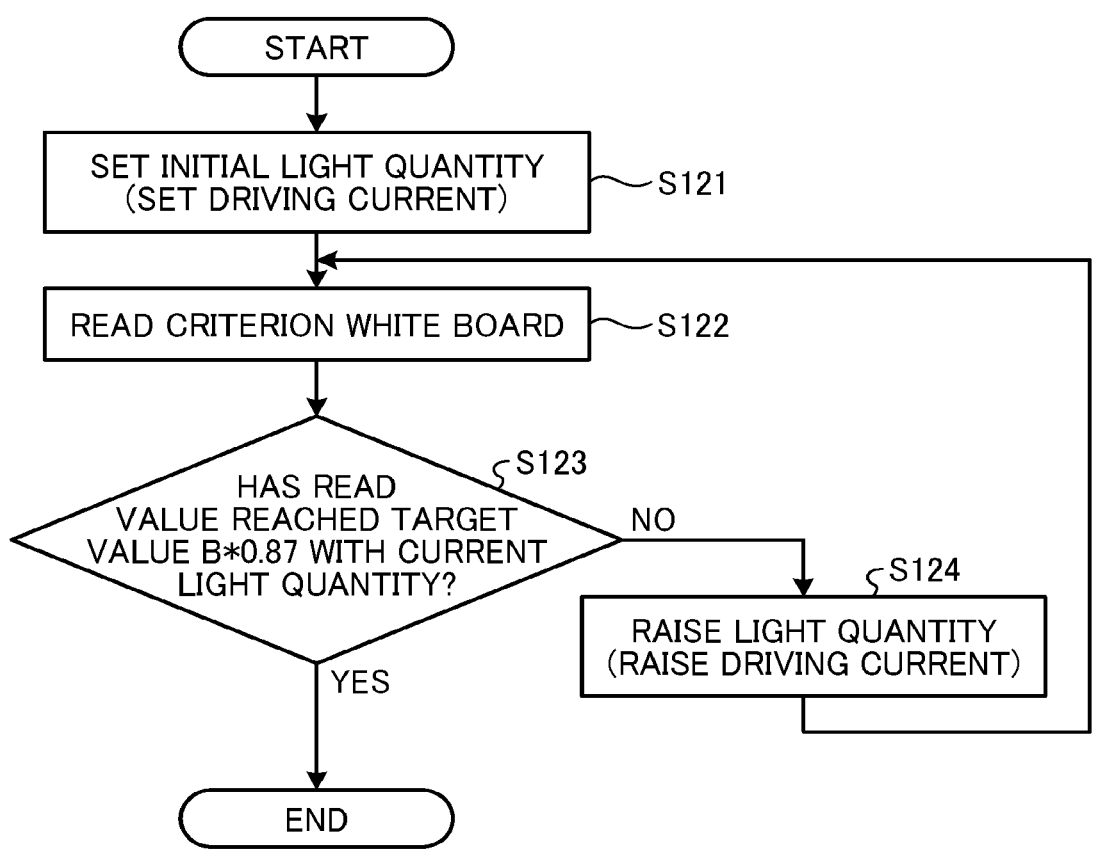
FIG. 10 is a flowchart of a control flow of a light-quantity adjustment operation with an extended density handling range in color conversion.

FIG. 10 is a flowchart of a control flow of the light-quantity adjustment operation with the extended density handling range in color conversion. Steps S121 to S124 illustrated in FIG. 10 correspond to steps S111 to S114 illustrated in FIG. 9, respectively. The difference from FIG. 9 is that the target value B for determination of the read value is set at B*0.87 at step S123. That is, in order to read a subject brighter than the criterion white board, the adjustment target value for reading the criterion white board is previously set lower, so that the brighter subject is handled. This example indicates the target value in a case where the density of the criterion white board is 0.06 (conversion in reflectivity: approximately 87%). The target value is lower by 13% than the target value in the light-quantity adjustment of FIG. 9. That is a subject brighter by 13% than the criterion white board can be handled.

As described above, the adjustment target value for light-quantity adjustment, adjusted at a brighter level than the level of the criterion white board, extends the density handling range in color conversion, so that the subject brighter than the criterion white board can be handled.

Note that, although the adjustment target value has a reduction of 13% in this example, the adjustment target value corresponds to 100% in reflectivity. That is further reduction of the adjustment target value than the value indicated in the example enables handling of a reflectivity of 100% or more, namely, subjects in all density, in principle.

Second Modification

Reduction of influence of an error in quantization, enables enhancement of the accuracy of color conversion. A second modification describes reduction of influence of an error in quantization. Note that the same elements between the first modification and the second modification are denoted with the same reference signs, and thus the descriptions of the same elements will be omitted. A configuration different from the configuration according to the first modification, will be mainly described below.

Figure 11:
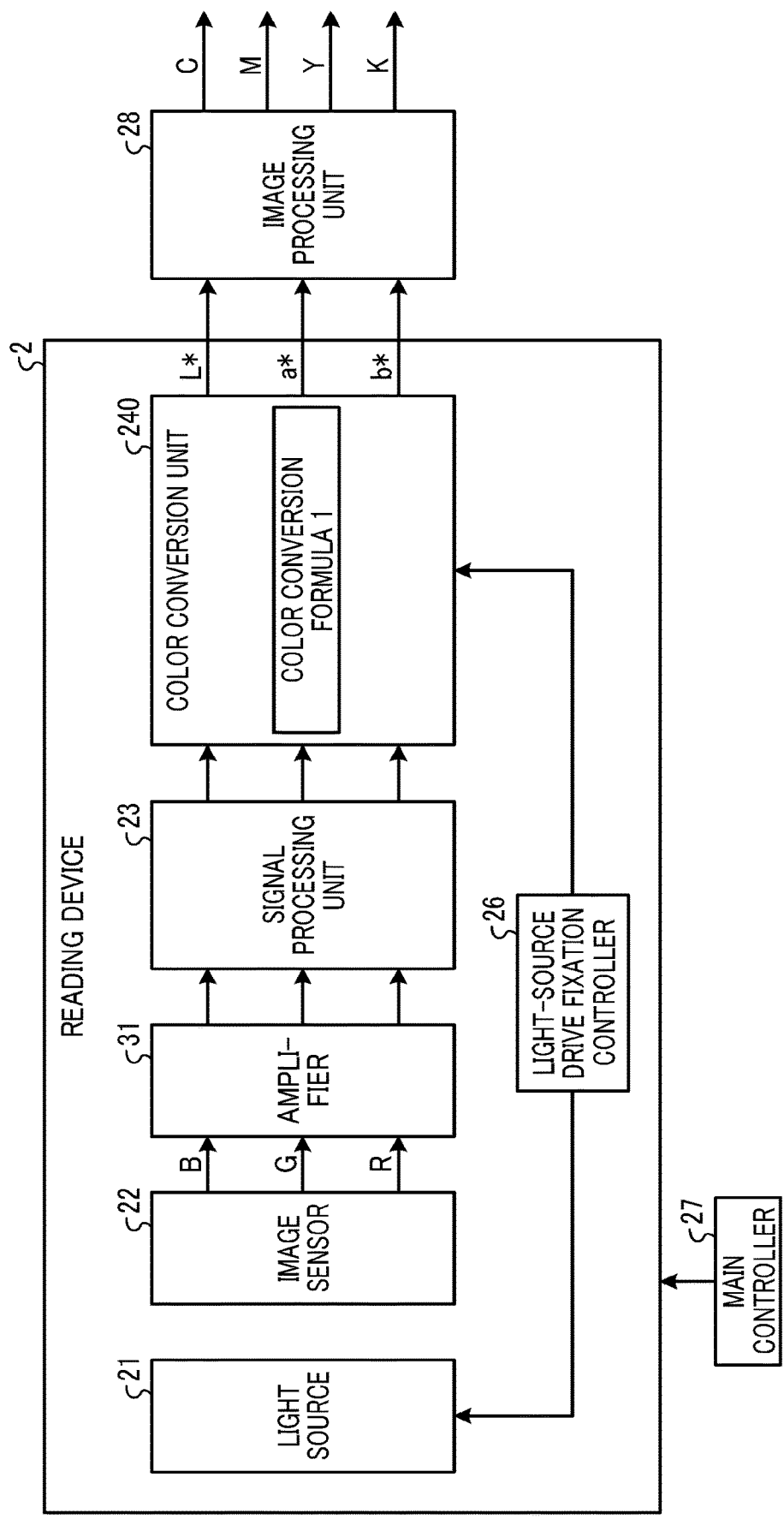
FIG. 11 is a diagram of an exemplary configuration of a reading device according to a second modification.

FIG. 11 is a diagram of an exemplary configuration of a reading device according to the second modification. A reading device 2 according to the second modification illustrated in FIG. 11 is different in configuration from the reading device according to the first modification (refer to FIG. 6) in that an amplifier 31 is provided.

The amplifier 31 amplifies an output of an image sensor 22, and outputs image data after the amplification to a signal processing unit 23. Then, a color conversion unit 240 performs color detection with a color conversion formula generated on the basis of the image data after the amplification.

Figure 12A:
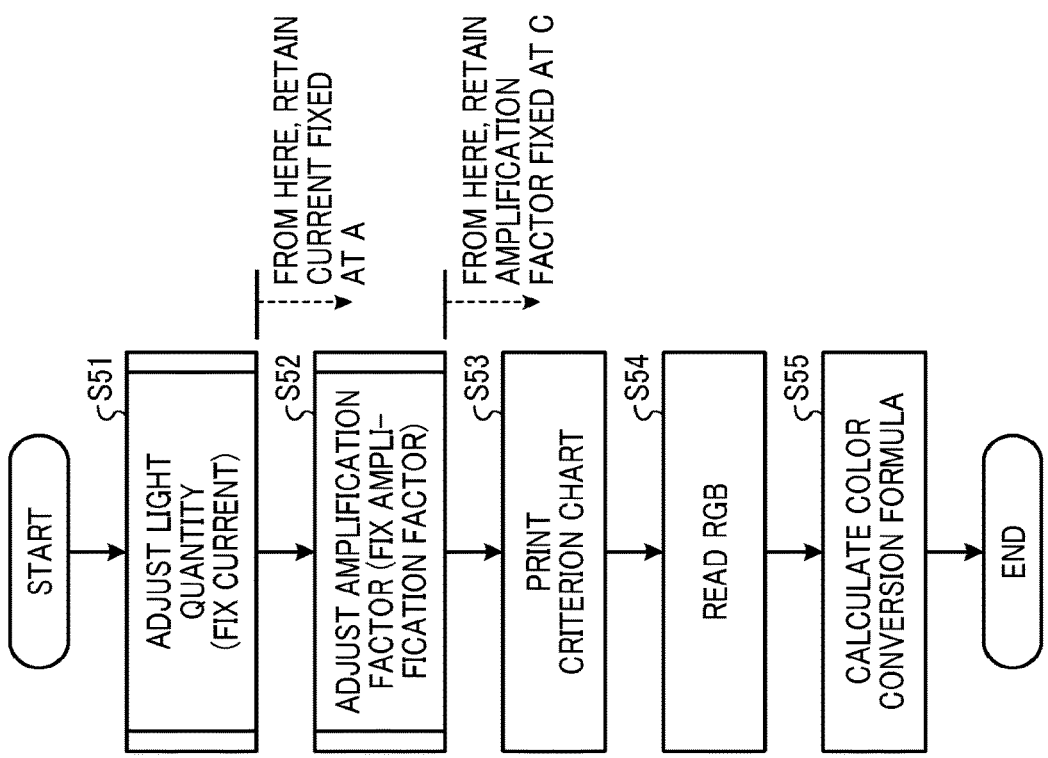
FIGS. 12A and 12B are each a flowchart of an exemplary control flow of a main controller.
Figure 12B:
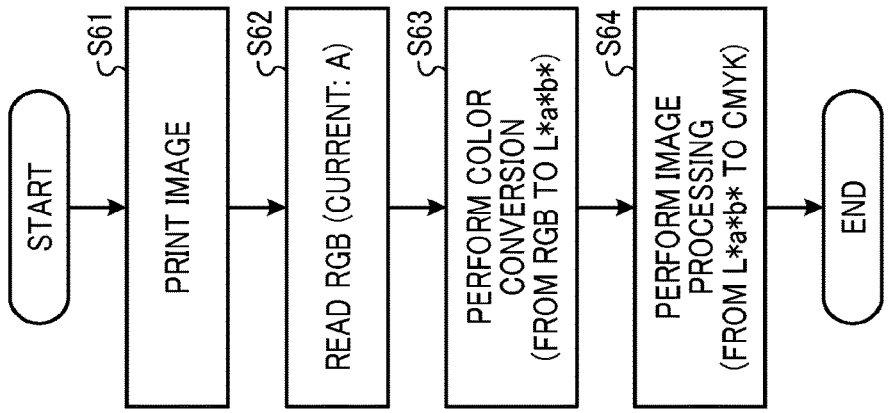

FIGS. 12A and 12B are each a flowchart of an exemplary control flow of a main controller 27. FIG. 12A illustrates a control flow in which a first information acquisition operation and an information conversion operation are performed at a color-detection preliminary stage. FIG. 12B illustrates a control flow in which a second information acquisition operation (or the first information acquisition operation) and an information conversion operation are performed at a color-detection execution stage.

Steps S51, S53, S54, and S55 in FIG. 12A correspond to steps S31, S32, S33, and S34 in the control flow illustrated in the first modification (refer to FIG. 7A), respectively. The difference from the first modification is that the main controller 27 performs amplification-factor adjustment at step S52. After light-quality adjustment, the main controller 27 performs the amplification-factor adjustment, and retains the amplification factor fixed at an amplification factor C.

Steps S61 to S64 in FIG. 12B correspond to steps S41 to S44 in the control flow illustrated in the first modification (refer to FIG. 7B), respectively.

As described above, according to the second modification, the output of the image sensor 22 is amplified, and use of the image data after the amplification allows relative reduction of influence of an error in quantization. Therefore, the accuracy of color conversion can further improve.

Second Embodiment

Exemplary application of the reading device 2 according to the first embodiment to an image forming apparatus, will be described. Here, exemplary application of the reading device 2 to a multifunction peripheral that is an exemplary image forming apparatus, will be described.

Figure 13:
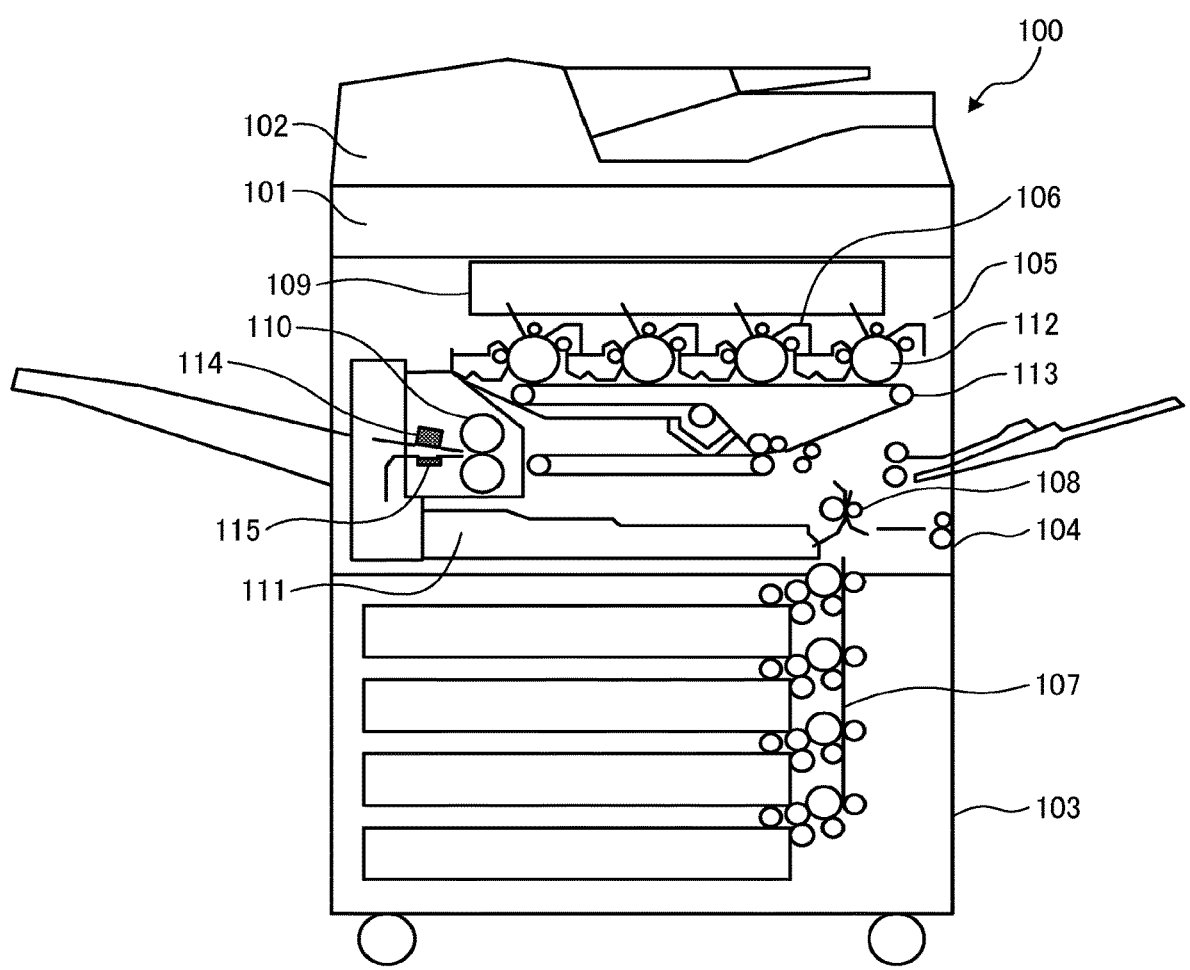
FIG. 13 is a view of an exemplary configuration of a multifunction peripheral according to a second embodiment.

FIG. 13 is a view of an exemplary configuration of the multifunction peripheral according to a second embodiment. A multifunction peripheral 100 illustrated in FIG. 13 includes an image reading unit (a reading unit 101 and an auto document feeder (ADF) 102) and an image forming unit 103 underlying the image reading unit. For description of the internal configuration of the image forming unit 103, the internal configuration is illustrated with an external cover removed.

The ADF 102 automatically conveys an original mounted on a mount. The reading unit 101 having an upper face including a contact glass on which the original is to be mounted, reads the original on the contact glass. Specifically, the reading unit 101 is a scanner internally including an illuminating device, an optical system, and an image sensor, such as a charge coupled device (CCD). The reading unit 101 causes the image sensor to read reflected light from the original illuminated by the illuminating device, through the optical system.

The image forming unit 103 includes a sheet feeding roller 104 into which a recording sheet is to be manually fed and a recording-sheet supply unit 107 that supplies a recording sheet. The recording-sheet supply unit 107 has a mechanism of feeding a recording sheet from a multistage recording-sheet feed cassette. The supplied recording sheet is sent to a secondary transfer belt through a registration roller 108.

A toner image on a primary transfer belt is transferred, at a transfer unit, to the recording sheet being conveyed on the secondary transfer belt.

The image forming unit 103 includes an optical writing device 109, tandem-system image forming devices 105 for, e.g., yellow (Y), magenta (M), cyan (C), and black (K), an intermediate transfer belt 113, and the second transfer belt. Through the image formation process of the image formation devices 105, an image written by the optical writing device 109 is formed as a toner image on the intermediate transfer belt 113.

Specifically, each of the image formation devices 105 including four photoconductor drums for, e.g., Y, M, C, and K rotatably, includes image formation elements 106 including a charging roller, a developing device, a primary transfer roller, a cleaner unit, and a neutralizing device, on the periphery of each photoconductor drum. The image formation elements 106 function at each photoconductor drum, so that an image on the photoconductor drum is transferred onto the intermediate transfer belt 113 by the primary transfer roller.

The intermediate transfer belt 113 is stretched by a driving roller and a driven roller, the intermediate transfer belt 113 being disposed through the nip between each photoconductor drum and the corresponding primary transfer roller. With the intermediate transfer belt 113 traveling, a secondary transfer device secondary-transfers the toner image primary-transferred to the intermediate transfer belt 113, to the recording sheet on the secondary transfer belt. The recording sheet is conveyed to a fixing device 110 due to the traveling of the secondary transfer belt. The fixing device 110 fixes the toner image as a color image onto the recording sheet. After that, the recording sheet is ejected to an out-machine sheet ejection tray through a reading device 114 (corresponding to the reading device 2). A criterion white board 115 is disposed opposite the reading device 114. Note that, for double-sided printing, a reverse mechanism 111 reverses the recording sheet upside down, and then the reversed recording sheet is sent onto the secondary transfer belt.

Because the image forming apparatus includes the reading device 2 indicated in the first embodiment in this manner, the image forming apparatus having highly color reproducibility can be provided. A criterion chart for generation of a color conversion formula is printed with the color member of the image forming apparatus itself, and the color conversion formula is generated with the criterion chart. Thus, the color conversion formula can be optimized to the printing characteristic of the image forming apparatus itself, so that the accuracy of color conversion can further improve.

There is a process of performing color inspection for a liquid crystal display, sheet-metal coating, or highly color-rendering color member. The reading device 2 according to the first embodiment can be applied to the process of the color inspection, in addition to the image forming apparatus. In that case, an inspection device having a highly inspection function can be provided.

Third Embodiment

The information detecting device 1 illustrated in FIG. 1 can be applied to, for example, a time-of-flight (TOF) ranging device. TOF is a ranging method of measuring the time of flight from when light is emitted to an arbitrary object until when the light returns, to measure the distance. For TOF, the time of flight of first light acquired for calibration from a criterion target is regarded as first information. The time of flight of second light acquired from a measurement target is regarded as second information. Means of converting the time of flight into distance information, with the time of light of first light, is regarded as an information converter. The distance information regarding the measurement target is regarded as third information. The light wavelength of the first light and the light wavelength of the second light are regarded as an information-acquisition condition. Means of fixing the light wavelengths at the same wavelength is regarded as an information-acquisition controller. In this case, a difference in light wavelength between the first light and the second light, causes the weight of the time of flight to change, resulting in an error in ranging. However, the information detecting device 1 illustrated in FIG. 1 makes the first light and the second light identical in light wavelength, to enhance the correlation in the time of flight between the first light and the second light. Thus, the accuracy of conversion into distance information can improve. That is the accuracy of ranging can be enhanced.

The controller of the information detecting device according to the present embodiment (the respective controllers according to the embodiments and the modifications are included) may include dedicated hardware or a general-purpose computer. For the general-purpose computer, a central processing unit (CPU) executes a program stored in, for example, a read only memory (ROM). Thus, the controller implements the functional units that perform the various operations, to control the various operations and each unit. The program previously installed on the ROM may be provided. The program in an installable file format or in an executable file format, recorded on a computer-readable recording medium, such as a compact disc (CD)-ROM, a flexible disk (FD), a CD-recordable (R), or a digital versatile disk (DVD), may be provided. The program stored in a computer connected to a network, such as the Internet, may be downloaded for provision.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information detecting device to detect information from a target, the information detecting device comprising:
  processing circuitry configured to
    perform a first information acquisition operation of acquiring first information from a target criterion irradiated with light from a light source, a second information acquisition operation of acquiring second information from the target irradiated with light from the light source, and an information conversion operation of converting the second information acquired by the second information acquisition operation, into third information, with the first information acquired by the first information acquisition operation, wherein the third information has a dimension different from respective dimensions of the first information and the second information; and control the light source such that an information-acquisition condition used to drive the light source in the first information acquisition operation is identical to an information-acquisition condition used to drive the light source in the second information acquisition operation.

2. A reading device, comprising:

a light source configured to irradiate a subject with light;

a reading sensor configured to receive the light from the subject; and processing circuitry configured to control a first reading operation of reading a criterion subject, a second reading operation of reading the subject, a color-conversion-formula generation operation of generating a color conversion formula with first color information acquired by the first reading operation, and a color conversion operation of converting second color information acquired by the second reading operation, into third color information, with the color conversion formula, wherein the third color information has a color space different from respective color spaces of the first color information and the second color information; and control the light source such that an irradiation condition used to drive the light source in the first reading operation is identical to an irradiation condition used to drive the light source in the second reading operation.

3. The reading device according to claim 2, wherein the color-conversion-formula generation operation is performed for an individual object of the light source.

4. The reading device according to claim 2, wherein the light source includes a light emitting diode.

5. The reading device according to claim 2, wherein the irradiation condition used to drive the light source includes a value of a driving current of the light source.

6. The reading device according to claim 5, wherein the processing circuitry is configured to:

perform a light-quantity adjustment operation of adjusting the value of the driving current before the color-conversion-formula generation operation; and perform adjustment in the light-quantity adjustment operation such that a light quantity of the light source is maximized.

7. The reading device according to claim 5, wherein the processing circuitry is configured to:

perform a light-quantity adjustment operation of adjusting the value of the driving current before the color-conversion-formula generation operation; and perform adjustment in light quantity in the light-quantity adjustment operation such that the first color information and the second color information are not saturated even in a case where the subject brighter than the criterion subject is read.

8. The reading device according to claim 7, wherein the subject read in the second reading operation is brighter than the criterion subject read in the first reading operation.

9. The reading device according to claim 5, further comprising an amplifier configured to amplify a signal from the reading sensor, wherein an amplification factor of the amplifier is adjusted after a light-quantity adjustment operation and before the color-conversion-formula generation operation.

10. An image forming apparatus comprising:

the reading device according to claim 2; and an image forming device configured to form an image, based on the third color information converted by the reading device.

11. The image forming apparatus according to claim 10, wherein the criterion subject includes a printing image formed by the image forming device.

12. The reading device of claim 2, wherein the processing circuitry is further configured to control the light source such that a first driving current used to drive the light source in the first reading operation is identical to a second driving current used to drive the light source in the second reading operation.

13. The reading device of claim 2, wherein the processing circuitry is further configured to control the light source such that a first driving voltage used to drive the light source in the first reading operation is identical to a second driving voltage used to drive the light source in the second reading operation.

14. An information detecting method of detecting information from a target, the information detecting method comprising:

performing a first information acquisition operation of acquiring first information from a target criterion irradiated with light from a light source;

performing a second information acquisition operation of acquiring second information from the target irradiated with light from the light source;

performing an information conversion operation of converting the second information acquired by the second information acquisition operation, into third information, with the first information acquired by the first information acquisition operation, wherein the third information has a dimension different from respective dimensions of the first information and the second information; and controlling the light source such that an information-acquisition condition used to drive the light source in the first information acquisition operation is identical to an information-acquisition condition used to drive the light source in the second information acquisition operation.

* * * * *